(No Model.) 3 Sheets—Sheet 1.
H. A. FLEUSS.
APPLIANCE FOR ENABLING PERSONS TO REMAIN UNDER WATER OR IN VITIATED AIR.
No. 244,043. Patented July 12, 1881.
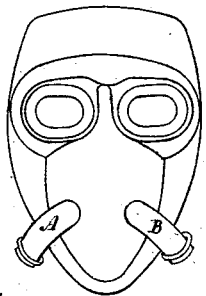
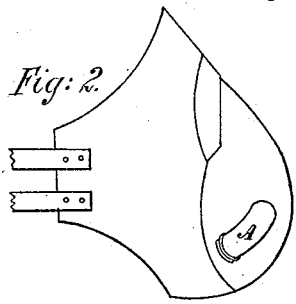
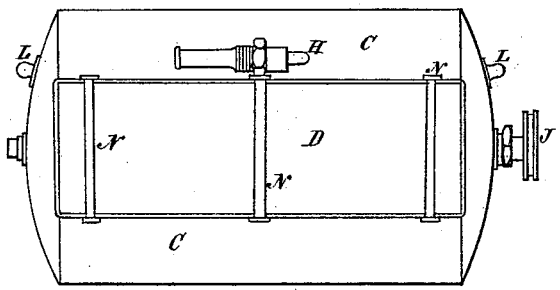
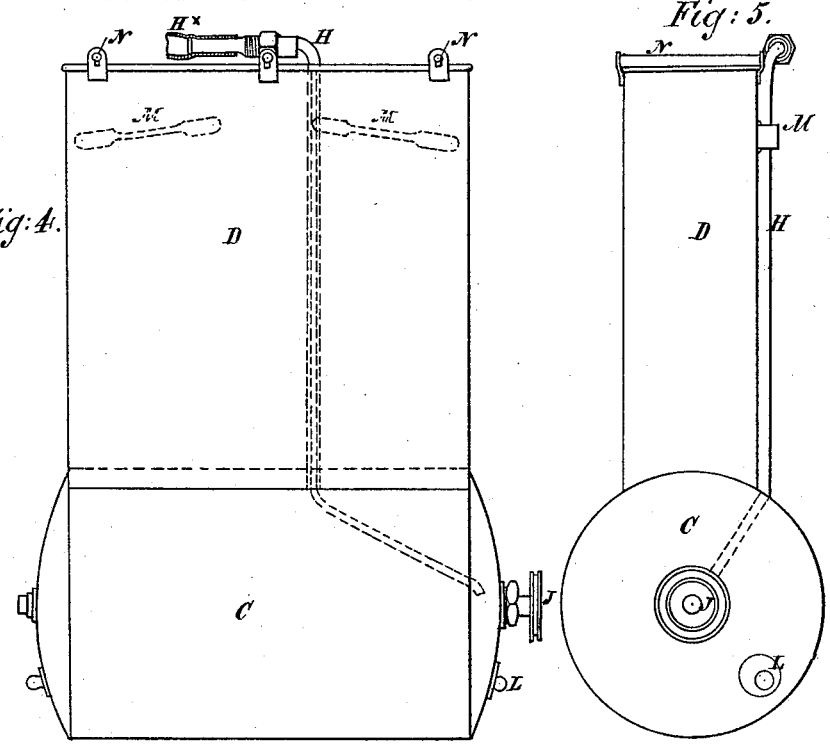
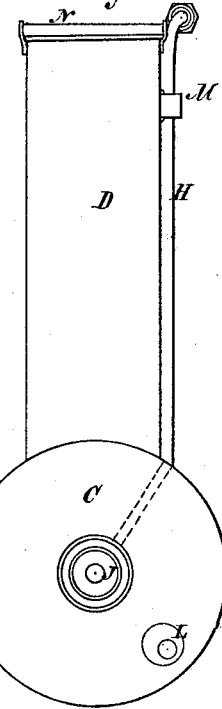
Witnesses. Inventor.
Wm A Skinkle Henry A. Fleuss,
Jos. S. Latimer By his Attorneys
Baldwin, Hopkins & Peyton
N. PETERS, Photo-Lithographer, Washington, D. C.

(No Model.)   H. A. FLEUSS.   3 Sheets—Sheet 2.
APPLIANCE FOR ENABLING PERSONS TO REMAIN UNDER WATER
OR IN VITIATED AIR.
No. 244,043.   Patented July 12, 1881.
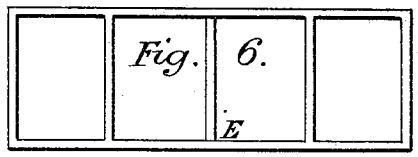
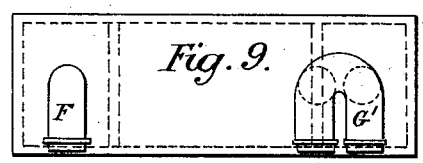
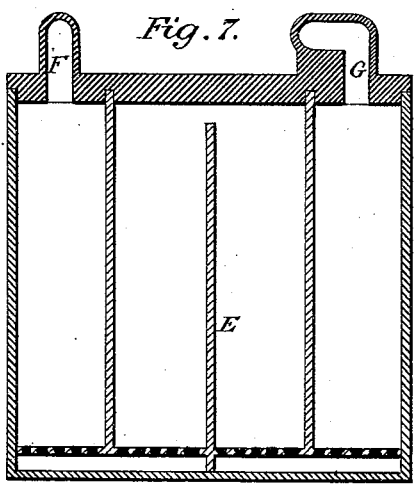
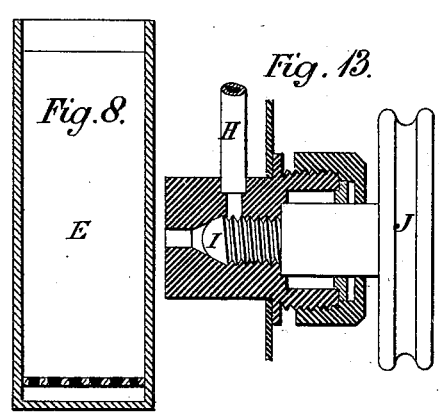
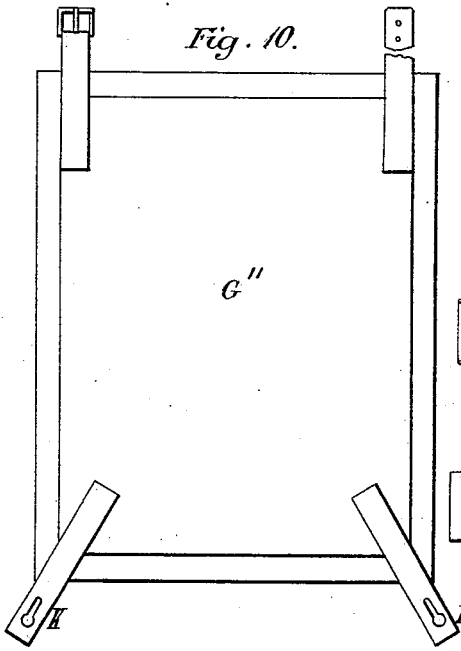
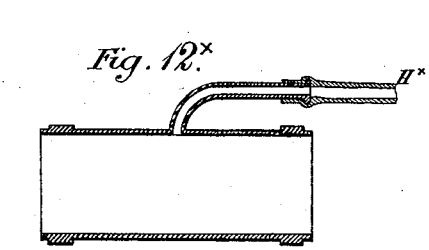
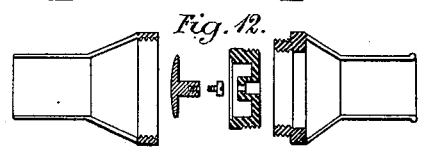

(No Model.)
H. A. FLEUSS.
APPLIANCE FOR ENABLING PERSONS TO REMAIN UNDER WATER OR IN VITIATED AIR.
No. 244,043. Patented July 12, 1881.
3 Sheets—Sheet 3.
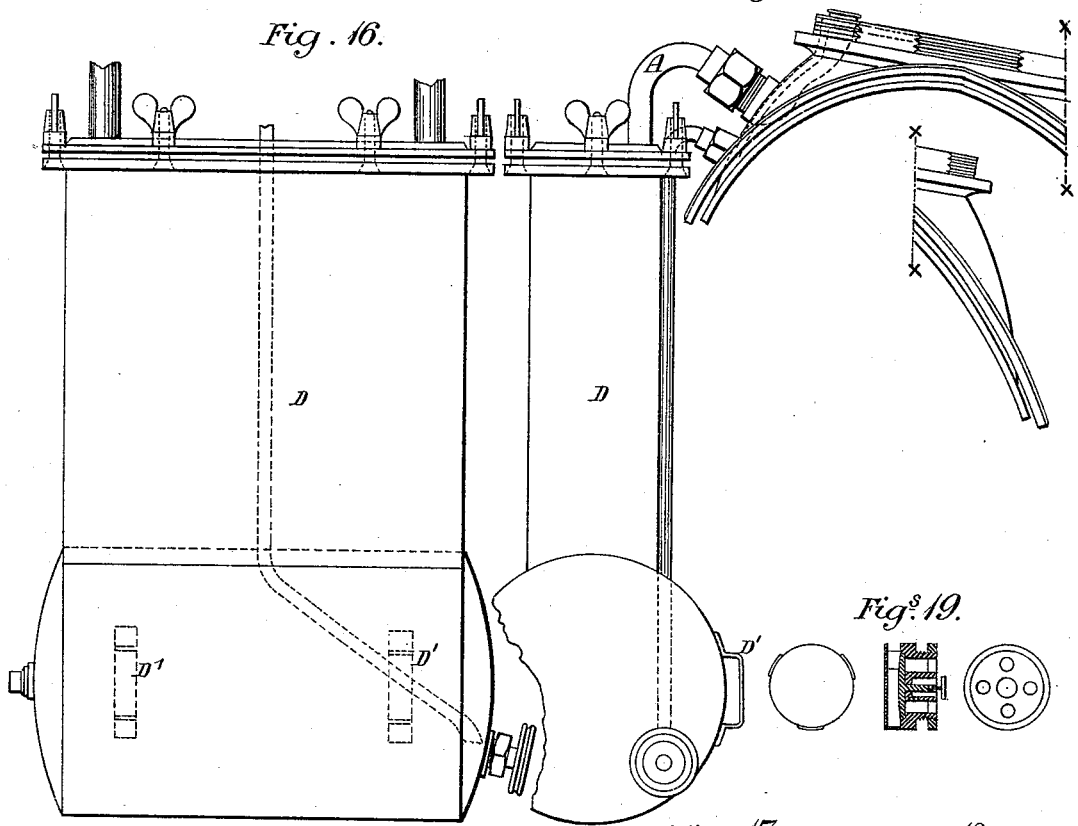
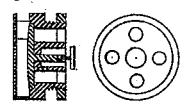
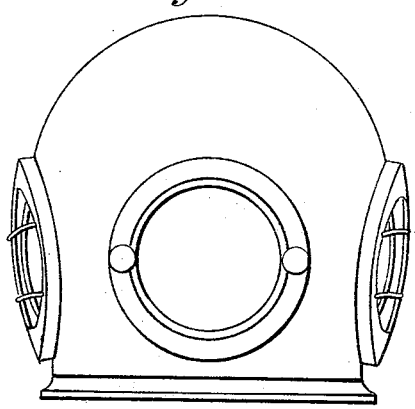
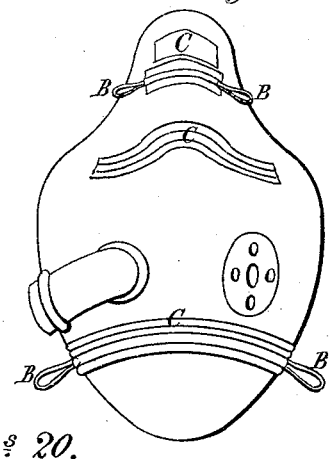
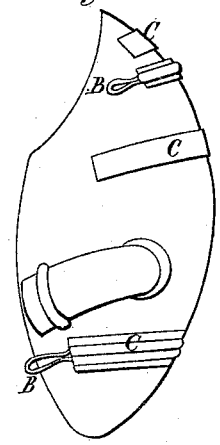
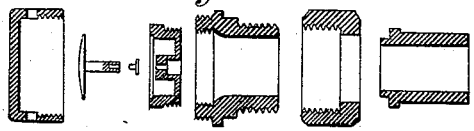
Witnesses,
Wm. A. Skinkle
Jas. S. Latimer
Inventor,
Henry A. Fleuss,
By his Attorneys
Baldwin, Hopkins & Peyton

UNITED STATES PATENT OFFICE.

HENRY A. FLEUSS, OF LONDON, ENGLAND.

APPLIANCES FOR ENABLING PERSONS TO REMAIN UNDER WATER OR IN VITIATED AIR.

SPECIFICATION forming part of Letters Patent No. 244,043, dated July 12, 1881.

Application filed February 7, 1881. (No model.) Patented in England October 13, 1879.

*To all whom it may concern:*

Be it known that I, HENRY ALBERT FLEUSS, a subject of the Queen of Great Britain, residing at No. 110 Cannon street, in the city of London, England, have invented certain new and useful Improved Appliances for Enabling Persons to Remain Under Water or in Vitiated Air, (for which I have received Letters Patent No. 4,137, dated October 13, 1879;) and I do hereby declare that the following is a full, clear, and exact description of the invention, which will enable others skilled in the art to which it appertains to make and use the same.

Heretofore persons working under water or in vitiated air have in most instances been supplied with fresh air through pipes into which fresh air is forced continuously by means of pumps, the pipes conducting the air to the helmet or dress worn by the person, or to a diving-bell in which the person or persons may be working. In other instances apparatus has been devised designed to enable persons to remain under water or in vitiated air without its being necessary to continuously pump fresh air to them, and means have been proposed for continuously absorbing (by means of caustic potash or similar substance) carbonic acid from the air exhaled by the person and for so rendering such air fit to be again inhaled, the requisite quantity of oxygen being from time to time restored to the air from a small reservoir containing oxygen under pressure.

My improvements relate to this latter method of enabling persons to remain under water or in vitiated air.

In the case of persons wearing diving-helmets and dresses capable of sustaining a certain amount of external pressure the helmets or dresses may be of ordinary construction, and the breath or exhaled air is conducted through a flexible tube, the end of which passes into or is enlarged to cover over the mouth of the person to a casing containing caustic potash or other substance capable of absorbing carbonic acid from it. The air, after it has passed through the casing, is conducted back again to the mouth to be inhaled, and inlet and outlet valves are provided to insure that the exhaled air shall be passed through the casing, and that the air shall only be inhaled after being purified; also, as has before been proposed, I make provision for restoring a fresh supply of oxygen to the purified air. I also make provision for carrying the caustic potash or like substance in such a manner that air shall always be able to percolate freely through it, as hereinafter described. One way of effecting these objects is to place over the mouth and nose of the person wearing the helmet and dress a mouth-piece somewhat similar in external appearance to an ordinary respirator. The mouth-piece I provide with an inlet-valve for admitting air to the mouth, and with an outlet having a flexible air-tight tube leading from it, by which the exhaled air is conducted to a casing or chamber containing numerous small pellets or lumps preferably of spongy india-rubber or other similar porous material saturated or coated with a strong solution of caustic potash.

The casing or chamber which contains the pellets or lumps I make with a perforated false bottom, upon which the pellets rest, and divide it by partitions in such a manner that the air in its passage from the inlet to the outlet of the case shall be caused to pass downward and upward through the spaces between the pellets or lumps. The vitiated air passes freely through the interstices between the pellets or lumps and has the carbonic acid absorbed from it by the caustic potash solution, and the air, after passing through the mass of pellets or lumps, is led off in a purified state from the outlet of the case, and passes back by another tube or passage and through a valve to the interior of the helmet, ready to be again breathed. As the air gets gradually deprived of oxygen the deficiency of oxygen is remedied by supplying oxygen to it from a small vessel containing oxygen under high pressure, as has before been proposed.

By using numerous pellets or lumps saturated or coated with caustic potash solution, as above described, for absorbing carbonic acid from the vitiated air the vitiated air is able to pass freely through the numerous interstices between the lumps or pellets, so that no difficulty is experienced in breathing, and the air may be brought into contact with a very extended potash-surface without much space being occupied.

For persons working in vitiated air a helmet is in most cases unnecessary, and a close-fitting mask or face-piece covering the mouth, nose, and ears of the wearer is substituted for the helmet and mouth-piece. A flexible air-bag is also provided, which will take in and give out air as it is inhaled and exhaled. The vitiated air exhaled by persons in submarine boats and diving-bells and such like constructions may in the same way be purified by causing it to pass from the mouths of the persons through air-tight tubes into and through a chamber or chambers containing porous or other pellets or lumps moistened with a strong solution of caustic-potash or other like solution.

The drawings hereunto annexed show apparatus constructed according to my invention.

Figures 1 to 12 show various views of apparatus suitable for being used by a person having to work in vitiated air.

Fig. 1 shows a front view, and Fig. 2 a side, of a mask or face-piece by which the mouth, nose, and ears of the person wearing it can be shut off from the surrounding air. The mask is also generally made with glazed openings, so as to protect the eyes. The mask is preferably formed, for the most part, of vulcanite or such like comparatively rigid material, while the edges are of thin, flexible, vulcanized india-rubber, which will fit closely about the face of the wearer. Straps are also provided, as shown, by which the mask can be fastened onto the face. Projecting out from the mask are also two pipes, A B, one for the inlet of purified air to the interior of the mask, the other for conveying the exhaled vitiated air to the purifying apparatus. This apparatus is most conveniently arranged to be carried on the back of the wearer by shoulder-straps. A plan view and side and end elevation of apparatus suitable for the purpose are shown at Figs. 3, 4, and 5.

At the bottom is a strong metallic vessel, C, charged with oxygen under high pressure. Above this vessel is a rectangular metallic case, D. Into the case D is fitted a rectangular vessel, E, formed of vulcanite or other suitable substance which will not be acted on by strong caustic-potash solution. The vessel E is shown at Figs. 6, 7, 8, and 9. It has a perforated false bottom and is divided into compartments by division-plates, two of which pass from the top of the vessel to the perforated false bottom, while the central one passes from the bottom of the vessel up to a short distance from its top. The compartments of the vessel are filled with spongy india-rubber covered with strong caustic-potash solution. The vessel is covered with a lid made to fit approximately air-tight by the interposition of a soft washer or packing between the lid and vessel. The lid is formed with two pipes passing from it. Through one of them (marked F) the exhaled vitiated air is led into one end compartment, while by the other (marked G) the air, after having passed upward and downward through the compartments of the vessel E, can pass back to the interior of the mask or mouth-piece, to be again breathed. The pipe G is formed with a branch pipe, G', standing out from it. From this branch pipe a flexible pipe is led to the interior of an air-tight flexible bag, G'', (shown at Fig. 10,) so that air can pass to and from this bag. The bag therefore serves as a flexible air-reservoir which will expand when air is exhaled and contract when air is again drawn from it into the lungs. The inlet and outlet tubes on the mask or mouth-piece are connected respectively to the inlet and outlet tubes on the lid of the vessel E by elastic tubes of vulcanized india-rubber. Each elastic tube is in two lengths, united together by a short metallic tube in which is an enlargement containing a valve. In the one elastic tube (the inhaling-tube) the valve-piece is placed so that the valve opens inward toward the mask, and in the other or exhaling-tube the valve opens outward or away from the mask. Each length of elastic tube is preferably made with corrugations in it, as shown at Fig. 11, so that it will readily stretch. The ends of the short tubes on the mask and on the lid of the vessel E and the ends of the tubular valve-piece have each a small projecting flange around them. The ends of the elastic tubes, when simply stretched over these ends, hold firmly to them and form air-tight points. The way in which I prefer to form the valves is shown at Fig. 12, each portion of the valve-piece being shown separately.

To restore to the air the requisite quantity of oxygen a small pipe, H, is led out from the metallic vessel C, in which the store of oxygen under pressure is contained, and by a flexible pipe, $H^x$, connected to it, is led into the flexible tube which is in connection with the elastic bag, a short length of metal tube, such as shown at Fig. $12^x$, being used where the smaller pipe is led into the larger one.

To control the passage of oxygen from the vessel C to the bag a valve, I, is employed which can be opened more or less, as required. The way in which I prefer to construct this valve is shown in detail at Fig. 13. By turning the handle J of this valve the valve can be screwed more or less away from its seat, and so a greater or less quantity of oxygen may be allowed to pass out from the vessel C through the small tube H. The loops K at the lower part of the bag are to pass over studs L at the ends of the vessel C. The straps at the upper part of the bag are to be buckled together and form a loop to hang over the neck of the wearer. The loops M on the metallic case D have leather straps, secured to them which straps are to be passed over the shoulders and crossed in front of the body, and their ends buttoned onto the studs L just mentioned.

The lid of the vessel E is held down and the vessel retained in the metallic case D by bars N, passed across the top of the case through eyes which project up from it, as shown. Small wedges may be inserted between the lid and the bars N, to prevent all movement of the lid.

When the apparatus is to be used for enabling persons enveloped in an ordinary diver's dress to work under water without fresh air having to be supplied continuously to the dress, as heretofore, the apparatus is modified in the manner shown at Figs. 14 to 19.

Fig. 14 shows a side elevation of the ordinary metallic shoulder-piece of a diver's dress with the apparatus combined with it. There is a clip-plate all around the edge of the shoulder-piece, by which the edge of the opening at the top of the diver's dress is clamped in the ordinary manner, and a tight joint made between them.

Fig. 15 is a front elevation of the helmet, which can be secured to the shoulder-piece in the ordinary manner by means of screw-threads cut away in segments, so that the helmet may be placed onto the shoulder-piece, and locked thereto by giving to it a partial turn.

Fig. 16 is a back view of the oxygen-reservoir and case containing the air-purifying material.

Figs. 17 and 18 are respectively a face view and side view of the mask or mouth-piece, which is to be secured over the nose and mouth of the wearer.

Fig. 19 shows, in detail, the way in which I prefer to construct the air-inlet valve to the interior of the mouth-piece.

The apparatus having to be used under water, it is necessary that the case D, containing the vessel which holds the caustic potash, should be closed by a strong metallic cover, with metallic pipes leading to and from it. The vessel E, which contains the caustic potash, is made with a flange around it at the top. The flange rests on the top of the vessel D. Above the top of the vessel E is placed a strip of sheet vulcanized india-rubber, and above this the metallic cover. The cover may be secured as shown at Figs. 14 and 16. From the cover pass two pipes, each secured by union joints to the shoulder-piece of the dress, as shown. Holes are formed through the sheet vulcanized india-rubber, opposite the ends of the two pipes. By one of these pipes (marked A in Fig. 14) the exhaled air is led from the mouth-piece to the vessel containing the caustic potash, by the other the purified air is returned to the interior of the helmet and dress, which serves the purpose of the air-bag of the previously-described apparatus. A valve (shown in detail at Fig. 20) is placed at the end of the return-pipe from the case D, to prevent air from being drawn backward through the case. The small pipe from the oxygen-reservoir is also connected by a union to the shoulder-piece, and a continuation of this small pipe leads into the interior of the helmet. As the mask or mouth-piece is not required to be made to cover and protect the eyes it is made smaller than the one shown at Figs. 1 and 2, and it can be held over the mouth and nose by elastic bands passed around the head from loops B B. Strips of soft metal, C, may be embedded in or secured to the material of which the mouth-piece is formed, so that it may be bent and fitted to the face of the person who is to wear it. Like the mask or mouth-piece shown at Figs. 1 and 2, the mouth-piece is formed with a short length of outlet-pipe, to which to connect one end of a flexible tube, the opposite end of which is coupled to the end of a pipe or passage leading to the interior of the vessel which contains the caustic potash. The mouth-piece also carries an inlet-valve. (Shown in detail at Fig. 19.) This allows purified air to pass into the mouth-piece from the interior of the helmet.

D' D' are metal loops on the exterior of the oxygen-reservoir, through which a strap may be passed, and the strap buckled around the waist of the person wearing the diving-dress. The strap will be outside the dress.

Having thus described the nature of my invention and the manner of performing the same, I would have it understood that I do not broadly claim apparatus for enabling persons to work in vitiated air; nor do I claim, unqualifiedly, such apparatus, even though provided with a mask or face-piece, inlet and outlet valve-tubes for inhaling and exhaling the air, an air-reservoir with which said tubes connect, and means for absorbing carbonic acid from the vitiated air as it passes from the mask to the air-reservoir. Such apparatus, broadly considered, is older than my invention, as is also one form of apparatus designed to enable persons to work in vitiated air, by which it was attempted to make provision for restoring to the impure or exhaled air a supply of oxygen from a reservoir; and I do not claim, broadly, or in every form, apparatus designed for the use to which my improvements are applied and provided with a reservoir of compressed oxygen. I do not, however, confine myself to the exact construction of the apparatus as hereinbefore set forth, as this may be varied. For example, in place of the air-tight tube used for conveying the exhaled air from the mouth of the person to the vessel containing caustic potash being formed with an enlarged mouth-piece to fit over the face of the person, the end of the tube might be held inside the mouth and the lips of the person be used to secure an air-tight joint. In this case, when a diver's helmet is worn, air may be inhaled directly from the interior of the helmet; or, if no helmet is worn, then the tube held in the mouth may be branched and one branch made to serve to convey air to the case containing caustic potash, and the other to convey air back again from the case and elastic bag to the mouth. When the end of the flexible tube is inserted into the mouth and not formed with a mask to fit the face a clip would have to be worn upon the nose to prevent breathing through it.

I claim as my improvements in apparatus for enabling persons to remain under water or in vitiated air—

1. The combination of the case, the vessel therein for containing the material with which carbonic acid will readily unite, the exhaling-tube provided with the outwardly-opening valve, the inhaling-tube provided with the inwardly-opening valve, the reservoir for compressed oxygen, and connections between said reservoir and the inhaling-tube, by which to supply the air with oxygen, substantially as hereinbefore set forth.

2. The combination of the partitioned vessel provided with the perforated false bottom, the valved inhaling-tube, the valved exhaling-tube, and the mask or mouth-piece, substantially as and for the purpose hereinbefore set forth.

3. The combination of the mask or mouth-piece, the inhaling and exhaling valved tubes, and the vessel with which they connect, provided with the pellets saturated as described, for the purpose set forth.

4. The combination of the partitioned vessel for the carbonic-acid-absorbing material, provided with the perforated false bottom, and having the pipes F and G, the valved exhaling and inhaling tubes, the reservoir for compressed oxygen, and the valved tube by which the amount of oxygen supplied to the air to be inhaled may be regulated, substantially as and for the purpose hereinbefore set forth.

5. The combination of the case for containing material with which carbonic acid will readily unite, the valved inhaling and exhaling tubes, the flexible bag or air-reservoir, the reservoir for compressed oxygen, and the connection by which the oxygen may be supplied to the air to be inhaled, substantially as hereinbefore set forth.

London, 6th January, 1881.

HENRY ALBERT FLEUSS.

Witnesses:
JOHN DEAN,
J. WATTS.
*Both of* 17 *Gracechurch Street, London.*